United States Patent [19]

Lamond

[11] 4,309,399

[45] Jan. 5, 1982

[54] UPGRADING OF THERMAL BLACK REJECT MATERIAL

[75] Inventor: Trevor G. Lamond, Quincy, Ill.

[73] Assignee: J. M. Huber Corporation, Locust, N.J.

[21] Appl. No.: 186,984

[22] Filed: Sep. 15, 1980

[51] Int. Cl.³ .......................... C01B 31/02; C09C 1/48
[52] U.S. Cl. .................................... 423/450; 423/461; 23/314
[58] Field of Search ............... 423/449, 450, 460, 461; 23/314

[56] References Cited

U.S. PATENT DOCUMENTS 3,347,638 10/1967 Gerdes .................................... 23/314
3,989,473 11/1976 Henderson ............................ 23/314

FOREIGN PATENT DOCUMENTS 845041 8/1960 United Kingdom .................. 23/314

*Primary Examiner*—O. R. Vertiz
*Assistant Examiner*—Gregory A. Heller
*Attorney, Agent, or Firm*—Ernest A. Schaal; Harold H. Flanders

[57] ABSTRACT

Reject material which has been removed from a thermal black process by a screen and impinged on a plate in the bag filter, can be upgraded by removing material which has been reduced in size by being sucked into the bag filter, and adding that material to the product stream. The material of reduced size is removed by a vibrating screen. Some 50 to 60% of the reject material can be upgraded by this process.

3 Claims, 1 Drawing Figure

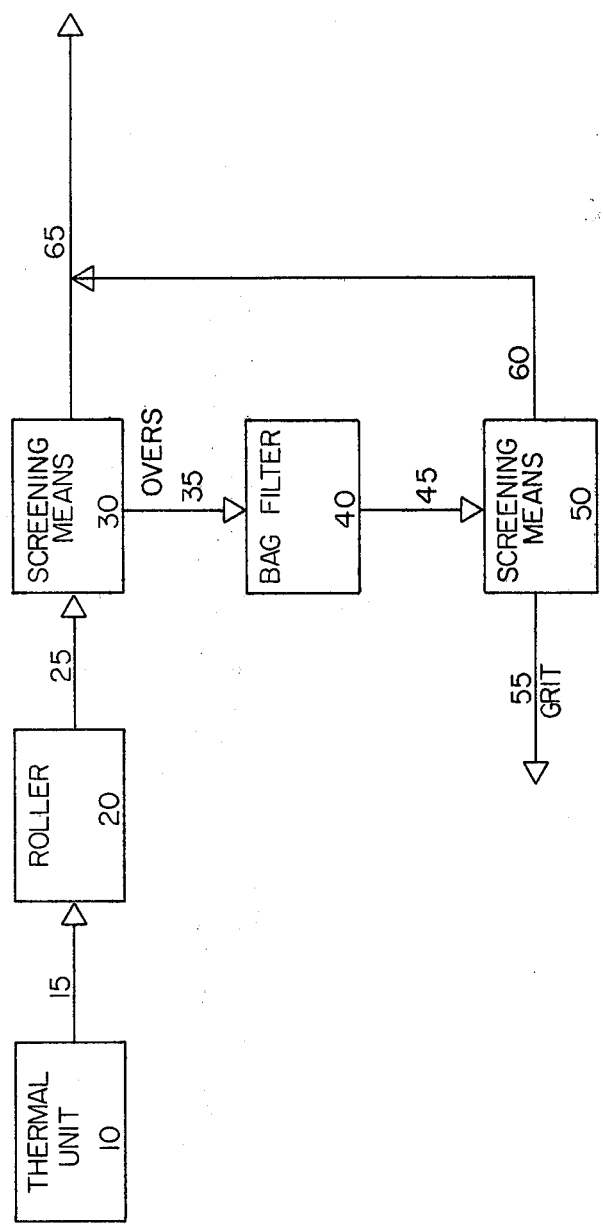

UPGRADING OF THERMAL BLACK REJECT MATERIAL

BACKGROUND OF THE INVENTION

The present invention relates to upgrading thermal black reject material to produce a low grit carbon black.

In the manufacture of carbon black, grit frequently becomes concentrated in the +10 mesh material. To produce a low grit black it frequently becomes necessary to reduce grit levels by removing the 10+ mesh material by a screening method. This is effective in reducing grit levels but it also removes large pellets of low grit material. Micropulverizing this material does not reduce grit levels significantly. It may reduce 35 mesh grit but increases 60 and 325 mesh grit at the same time.

In prior art processes, a carbon black is produced by thermal decomposition of a hydrocarbon feedstock, the carbon black is pelletized, the over-sized material removed from the carbon black by a screening method and the over-sized material is sucked by a vacuum into a bag filter where it is impinged on a plate. The preferred means of pelletizing thermal carbon black is in a drum roller. The preferred screening means is a rotating screen which removes the 10+ mesh material.

A prior art solution to the grit problem is to separate the gritty material from the carbon black prior to pelletization. This process reduced the gritty material in the product, but it also caused large amounts of low grit material to be classified as reject material.

SUMMARY OF THE INVENTION

Accordingly, it is an object of this invention to provide a new and highly effective process which overcomes the deficiencies of the prior art as described above.

Another object of the present invention is to increase the yield of the thermal black process by reducing the amount of low grit carbon black discarded as reject material.

Still another object of the present invention is to reduce the energy needed to increase the yield of low grit thermal black.

Other objects and a fuller understanding of this invention may be had by referring to the following description and claims taken in conjunction with the drawing.

The present invention overcomes the deficiencies of prior art and achieves its objectives by removing material which has been reduced in size by the process of sucking the over-sized material into the bag filter where it is impinged on a plate, and adding the material of reduced size to the carbon black. A vibrating screen can be used to remove the material that is less than 46 mesh. Some 50 to 60% of the material can thus be recycled to the product stream as low grit material.

BRIEF DESCRIPTION OF THE DRAWING

In order to facilitate the understanding of this invention, reference will now be made to the appended drawing. The drawing should not be construed as limiting the invention but is exemplary only. The drawing is a block diagram representation of one embodiment of the present invention.

DESCRIPTION OF THE PREFERRED EMBODIMENT

In its broadest aspect, the present invention is based on the discovery that sucking the over-sized material into a bag filter where it is impinged on a plate, breaks up the large pellets of carbon black but does not break up the large agglomerations of grit. Therefor, the carbon black can be separated from the grit by the use of a screening process and then it can be added to the carbon black, thereby increasing the yield of carbon black process.

In a preferred embodiment of the present invention, carbon black is produced by thermal decomposition of a hydrocarbon feedstock, the carbon black is pelletized in a drum roller, the carbon black is screened by a rotating screen to remove the material larger than 10 mesh from the product stream, the over-sized material (10+ mesh) is sucked into a bag filter where it is impinged on a plate, this material is screened by a vibrating screen to remove the material smaller than 46 mesh, then this smaller material is added to the product stream.

One embodiment of this invention is shown in the drawing. In the drawing, the carbon black is produced by partial thermal decomposition of a hydrocarbon feedstock in thermal unit 10; it is then passed from thermal unit 10 to drum roller 20 via thermal unit discharge line 15. The material in drum roller 20 is agglomerated into pellets and is passed from drum roller 20 to screen 30 via drum roller discharge line 25. Screen 30 removes the 10+ mesh material from the carbon black and this over-sized material is vacuumed via screen discharge line 35 into bag filter 40 where it impinges upon a plate. The over-sized material is removed from bag filter 40 and is transferred by bag filter discharge line 45 into a vibrating screen 50 wherein the grit is removed and discarded via grit discharge line 55 and the carbon black material which has been reduced in size from its large pellets is recycled back via recycle line 60 to the thermal black product stream 65.

The preferred method of pelletizing thermal black is using a drum roller, but other means of pelletization can be used, such as pin mixers, pelletizing disks, pelletizing cones and multicone pelletizers.

The preferred screening means for removing the material of reduced size from the over-sized material is a vibrating screen, but other screening means can be used, such as fluid bed elutriation. In the fluid bed elutriation process, the material is fluidized, decanted and settled, which separates the material into parts according to their weight. The second screening means removes the 46-mesh black from the gritty reject material.

Although the process of the present invention was designed for upgrading the reject material of a thermal black process, it should also work for upgrading the reject material of a furnace black process.

While the applicant does not wish to be bound by any particular theory as to how his invention works, it is thought that the large agglomerations of low grit thermal black are softer than the gritty material, and are reduced in size by the work done in sucking them into the bag filter and impinging them on the plate inside the bag filters. The gritty material, being harder, is not reduced in size.

The present invention increases the yield of the thermal black process by removing from the reject material low grit thermal black that would otherwise be discarded with the reject material. The present invention reduces the energy needed to increase the yield of low grit thermal black by screening only part of the material produced, instead of all of it.

EXAMPLES

The invention will be further illustrated by the following examples which set forth the particularly advantageous method embodiments, while the examples are provided to illustrate the present invention they are not intended to limit it.

Thermal black was produced in a thermal unit by the partial thermal decomposition of a hydrocarbon feedstock; the thermal black was passed from the thermal unit to a drum roller where it was pelletized; the thermal black pellets were passed from the drum roller to a rotating screen where the material larger than 10 mesh was removed from the product stream, then the over-sized material was sucked into a bag filter.

A vibrating screen was installed after the bag filters in two separate process streams. The data on the reject material collected is shown in Table I. Approximately 60% of the reject material passed through a −46 mesh sieve. These overs had low 35 and 60 mesh grit.

TABLE I

| | Grit Levels of Various Sieve Fractions | | | | | |
|---|---|---|---|---|---|---|
| | Test 1 | | | Test 2 | | |
| Sieve Fraction | +10 | −10 | −46 | +10 | −10 | −46 |
| Wt., % | 5 | 34 | 60 | 3 | 28 | 68 |
| Grit, % | | | | | | |
| 35 Mesh | .565 | .12 | .0006 | * | .012 | .0007 |
| 60 Mesh | .517 | .0043 | .0005 | * | .027 | 0 |
| 325 Mesh | .474 | .002 | .0085 | 1.06 | .039 | .007 |

*Insufficient Sample

Thus, in operation, the present process upgrades the quality of reject material so that 60% of it can be recycled as low grit thermal black.

While the present invention has been described with reference to specific embodiments this application is intended to cover those various changes and substitutions which are known to be made by those skilled in the art without departing from the spirit and scope of the appended claims.

I claim:

1. In the process comprising producing a carbon black by thermal decomposition of a hydrocarbon feedstock, pelletizing said carbon black, removing over-sized material from the carbon black by a first screening means, and sucking the over-sized material into a bag filter where it is impinged on a plate, the improvement which comprises:
    (a) removing material which has been reduced in size by being sucked into the bag filter and impinged on the plate from the over-sized material by a second screening means; and
    (b) adding the material of reduced size to the carbon black.

2. A process according to claim 1 wherein the second screening means is a vibrating screen.

3. A process according to claim 2 wherein the material of reduced size is less than 46 mesh in size.

* * * * *